Aug. 22, 1950 R. H. HOGLUND 2,519,763
ELECTRONIC GATING CIRCUIT
Filed April 30, 1946
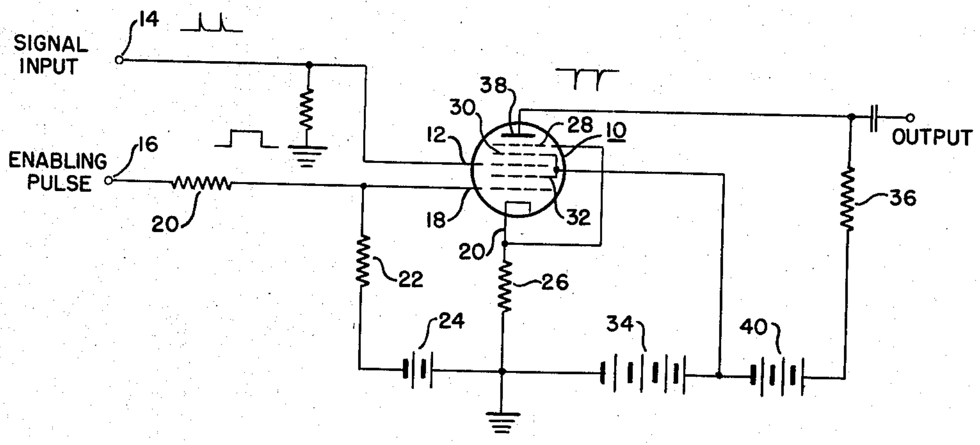
INVENTOR
RALPH H. HOGLUND
BY
William D. Hall
ATTORNEY Patented Aug. 22, 1950

2,519,763

UNITED STATES PATENT OFFICE 2,519,763

ELECTRONIC GATING CIRCUIT

Ralph H. Hoglund, Bellmore, N. Y., assignor to United States of America as represented by the Secretary of War Application April 30, 1946, Serial No. 666,028

1 Claim. (Cl. 250—27)

This invention relates generally to electrical circuits and in particular to improvements in electronic switching circuits.

The electronic switching circuit here described is of the type in which an energizing pulse, hereinafter referred to as a gate or enabling pulse, is applied to a vacuum tube circuit to control its amplifying action or switching condition. A common utilization of such switching circuits, for example, is in radio-echo (radar) systems in which a receiver component is made insensitive to signals during transmission periods. A disadvantage of prior circuits of this nature has been that the gate or enabling pulse also appears in the output of the switching circuit unless removed by cumbersome circuits requiring critical adjustments.

It is an object of this invention to provide a new and improved electronic switching circuit.

Other objects, features, and advantages of this invention will suggest themselves to those skilled in the art, and will become apparent from the following description of the invention taken in connection with the accompanying drawing.

The single figure shown in the drawing is a schematic diagram of a circuit embodying the principles of the invention.

Referring now to the drawing, the vacuum tube 10 is of the pentagrid converter type such as the commercially available 6SA7, or a similar tube in which the cathode current is independent of the voltage on a signal grid 12. The reference point for voltages in the circuit here described is indicated by the conventional ground symbol. The signal input may, for example, consist of relatively sharp pulses as indicated, and is communicated from an input terminal 14 to grid 12. Rectangular pulses of suitable width, hereinafter referred to as gate or enabling pulses, are applied to a terminal 16 and are communicated to a control grid 18 through a resistor 20. The control grid 18 connects to the cathode 20 of tube 10 through the grid resistor 22, a biasing source 24, and a cathode resistor 26 serially connected as shown. Biasing source 24 acting through resistors 22 and 26 normally causes the tube 10 to be in a cut-off condition. Cathode 20 and suppressor grid 28 are connected to ground through the unby-passed cathode resistor 26 which has a value best determined empirically. Screen grids 30 and 32 are placed at a common positive potential relative to ground by the voltage source 34 as indicated. The output signal appears across a load resistor 36 connected between plate 38 and a potential source 40 as shown.

In operation, a positive enabling or gate pulse applied to control grid 18 drives tube 10 into the conducting region. Signals applied to signal grid 12 are then amplified without substantially affecting the current in the cathode circuit. Between gate pulses, the tube is non-conducting due to the cut-off bias imposed on grid 18, and hence signal grid 12 is then ineffective in controlling the output.

The cathode resistor 26 provides degeneration in the grid 18-cathode 20 circuit to which the enabling or gate pulses are applied, the degeneration occurring because of the voltage built up across resistor 26 by the change in cathode current when the enabling pulse is applied. As a result, only a small amount of the gate or enabling pulse signal appears in the plate output, while normal amplification takes place for the signal on grid 12.

While there has been described what is at present considered to be the preferred embodiment of this invention, it will be obvious to those skilled in the art that various changes and modifications may be made therein without departing from the scope and spirit of the invention as set forth in the appended claim.

What is claimed is:

In an electronic switching apparatus the combination including a vacuum tube having a cathode, a cathode control grid, a positive grid, a plate control grid, and a plate, an unby-passed resistance in the circuit of said cathode, said cathode control grid being normally biased beyond cutoff and receiving positive gate pulses to permit current flow from said cathode, and said plate control grid receiving signal voltages to control the distribution of said current between said positive grid and plate, whereby signal voltages are amplified in the output of said plate under control of the gate pulses, but said gate pulses are substantially eliminated by degeneration in said resistor.

RALPH H. HOGLUND.

REFERENCES CITED

The following references are of record in the file of this patent:

UNITED STATES PATENTS

| Number | Name | Date |
|---|---|---|
| 2,212,558 | Blumlein | Aug. 27, 1940 |
| 2,404,047 | Florey et al. | July 17, 1946 |

OTHER REFERENCES

Review of Scientific Instruments, vol. 12, pages 191 and 192, April 1941.